United States Patent

De Wald

[15] 3,655,553

[45] Apr. 11, 1972

[54] PROCESS FOR GRAFTING POLYMERIC VINYL AND VINYLIDENE CHLORIDE SIDE-CHAINS TO POLYOLS AND FLUID DISPERSION COMPOSITIONS

[72] Inventor: Raymond C. De Wald, Douglassville, Pa.

[73] Assignee: The Firestone Tire & Rubber Company, Akron, Ohio

[22] Filed: Mar. 12, 1970

[21] Appl. No.: 19,105

[52] U.S. Cl. ................................. 252/1, 260/890, 260/899, 260/858, 260/859
[51] Int. Cl. ....................................................... C08f 29/24
[58] Field of Search ............... 252/1; 260/2 R, 2.5 R, 2.5 AP, 260/2.5 P, 890, 899, 857, 858, 873, 88.1, 77.5

[56] References Cited

UNITED STATES PATENTS

| | | | |
|---|---|---|---|
| 3,383,351 | 5/1968 | Stamberger | 260/33.2 |
| 3,247,291 | 4/1966 | Kahrs | 260/899 X |
| 3,075,928 | 1/1963 | Lanham | 260/2.5 |
| 3,260,687 | 7/1966 | Postol | 260/2.5 |

*Primary Examiner*—John T. Goolkasian
*Assistant Examiner*—M. E. McCamish
*Attorney*—S. M. Clark and Willard L. G. Pollard

[57] ABSTRACT

This invention comprises a process for grafting polymeric sidechains of vinyl and vinylidene chloride to triols such as polyethylenoxy or polypropylenoxy triols and the product produced thereby. It has been found that by the polymerization of specific mixtures of vinyl chloride and vinylidene chloride in the presence of such triols, polymeric sidechains are grafted to the polyols in such a manner that the grafted products have much lower viscosities than are obtained when either the vinyl chloride or the vinylidene chloride is used alone in otherwise identical grafting operations. The mixture can also contain a chain transfer agent to aid further in reducing the viscosity. The proportions used in the mono-mer mixtures are in the range of 15-88% by weight of vinyl chloride, 12-85%, preferably 15-85% vinylidene chloride, and 0-5 parts by weight of a chain transfer agent. The proportion of monomer in the polyol mixture is advantageously in the range of 21-45%, preferably 25-45% by weight based on the combined weight of monomer and polyol, and the resultant product advantageously has at least 15% by weight chlorine. The resultant chlorinated polyol is particularly useful in the preparation of polyurethanes having fire retardant properties, by the reaction of the polyols with diisocyanates such as toluene diisocyanate.

28 Claims, No Drawings

PROCESS FOR GRAFTING POLYMERIC VINYL AND VINYLIDENE CHLORIDE SIDE-CHAINS TO POLYOLS AND FLUID DISPERSION COMPOSITIONS

BACKGROUND OF THE INVENTION

1. Field of the Invention

The present invention relates to the preparation of chlorine-containing polyols by the grafting of polymeric sidechains having chlorine therein. More specifically, the invention relates to the grafting of polymeric vinyl chloride-vinylidene chloride sidechains onto polyols, such as polyethylenoxy and polypropylenoxy triols. Still more specifically, it relates to the production of chlorine-containing polyols having lower viscosities than obtained by the grafting of either vinyl chloride or vinylidene chloride onto a polyol molecule.

2. Description of the Related Prior Art

Polyurethanes manufactured from polyols containing various grafted sidechains show many desirable properties. However, the grafted polyols tend to have high viscosities which are undesirable for their reaction with diisocyanates in the manufacture of polyurethanes. It would be desirable to keep the viscosities of the grafted product in a range which permits easy processability for reaction with diisocyanates.

The Kahrs et al. U.S. Pat. No. 3,247,291 discloses the grafting of vinyl and vinylidene chloride onto various alkylene oxide polymers such as polyethylene oxide. However, the process of the patent produces only solids, and even when solvents are used viscous solutions or powders are obtained. In fact the polymers are solid even when relatively low amounts of chlorine are introduced, such as the 1.6% chlorine illustrated in Example 6.

Although Kahrs et al. mention incidentally in Column 1, Lines 32 and 38, that the halogen-containing monomers can be used in admixture with one another, it is obviously implied that the effect is merely additive and that similar results will be obtained whether the halogen-containing monomers are used individually or in combination with each other. There is no reason to assume that certain mixtures of vinyl and vinylidene chlorides would give anything but the solid products obtained in the various specific examples described.

The Stamberger U.S. Pat. No. 3,383,351 describes a process of polymerizing a minor amount of an ethylenically unsaturated monomer in a major amount of a normally liquid polyol free of ethylenic unsaturation and having a molecular weight of at least 500. The process is described as producing a substantially linear polymer dissolved in the polyol. Moreover, the product is defined as a liquid, stable dispersion of polymer polyol having a viscosity of less than 40,000 cps. at 10% polymer concentration. The patentee states, in the paragraph bridging Columns 3 and 4, "During this polymerization a minor amount of graft or block polymer is inherently produced."

In the list of monomers which are indicated as suitable for the process of the invention, the patentee mentions various vinyl and vinylidene halides. However, vinyl chloride and vinylidene chloride are noticeably omitted.

In conducting polymerizations of vinyl chloride and vinylidene chloride in such polyols, the patentees have found that the polymerizations of these monomers cause polymerizations which are uncontrollable and result in products either solid or heterogeneous and in any case of very high viscosity. Obviously, therefore, these monomers did not fit the qualifications described by the patentee as producing a polymer polyol dispersion having a viscosity of less than 40,000 cps. at 10% polymer concentration.

SUMMARY OF THE INVENTION

In accordance with the present invention, it has been found that fluid chlorinated polyols, that is chlorinated polyols of lower viscosity than previously obtained with corresponding graft-copolymerization of polyols with vinyl chloride or vinylidene chloride are produced by the grafting of a mixture of vinyl chloride and vinylidene chloride onto a polyol, predominantly a triol, having a molecular weight no less than 500, advantageously no less than 1,500 and preferably no less than 3,000, in the presence of a free radical generating catalyst, and preferably an azo-type catalyst. The monomer mixture should contain 15–88% by weight of vinyl chloride, 12–85%, preferably 15–85% by weight of vinylidene chloride and 0–5 percent by weight of a chain transfer agent. The proportion of monomer to polyol in the reaction mixture is in the range of 21–45 parts, preferably 24–45 parts by weight of monomer in 100 parts of combined weight of monomer and polyol.

The polyol is preferably a triol but can contain as much as 40% of a diol, or tetraol having the same molecular weight range. With such compositions the products are stable dispersions of the graft copolymer in the polyol. With diols and tetraols alone, heterogeneous products are obtained.

For practical use, the maximum viscosity of the grafted product is 100,000 centipoises. However, much lower viscosities, that is less than 40,000 cps., are preferred for easy processability in reacting with diisocyanates to produce polyurethanes, or for whatever other purpose the polyol is to be used.

The polymerization or grafting operation is performed at a temperature advantageously in the range of 30°–80° C., preferably 45°–75° C. At the higher temperatures more complete conversion is obtained in the shorter reaction time, whereas at lower temperatures longer reaction periods are required. At 65° C. a 20 hour reaction period generally produces approximately 95% conversion of the monomers. While satisfactory grafting can be obtained with even lower conversions of monomer, it is generally desirable for practical reasons to proceed to conversions of at least 50% and for most practical purposes to conversions of 90% or more. Depending on the polymerization temperature, it is generally desirable to continue the polymerization for a period of at least 2 hours, preferably longer, to obtain a satisfactory degree of conversion.

When the monomer mixture is outside the ranges indicated, higher viscosity or solid materials are produced, and/or the product is heterogeneous.

For the purpose of this invention the procedure used in determining viscosity is described in the American Society for Testing Materials test designated as D-1638-61T. Accordingly a commercially available test instrument is used, known as Brookfield Synchroelectric Viscometer — Model LVT. Viscosity is measured by determining the torque on a spindle rotated at constant speed in the sample.

The molecular weights of the polyols, that is triols, diols and tetraols, advantageously do not exceed 5,500, and are preferably no more than 5,000. The polyol molecular weights are in the range of 500–5,500, advantageously 1,500–5,000 and preferably 3,000–5,000. The proportion of diols and tetraols should not exceed about 40% of the total polyol weight.

The term "polyol" as used herein is intended to designate polymeric derivatives of alkylene oxides, such as ethylene oxide, propylene oxide and butylene oxide, having two or more terminal hydroxy groups. The diols can comprise homopolymers or copolymers of the alkylene oxides themselves. Triols are derived by using a trifunctional core such as glycerine, trihydroxymethylpropane, triethanolamine, and the like on which the alkylene oxides are polymerized, so as to give three terminal hydroxy groups. Tetraols are similarly produced by starting with tetrafunctional core compounds such as pentaerythritol, ethylene diamine, urea and the like so as to give four terminal hydroxy groups. The number of alkylene oxide groups added are sufficient to give the desired molecular weight as specified in the range of 500 to 5,500, advantageously 1,500 to 5,000 and preferably 3,000 to 5,000. These can be represented by the formula

wherein R represents hydrogen or an alkyl group of no more than two carbon atoms, n is 2, 3 or 4, and Y represents a core radical having a valency corresponding to the value of n. The portion within the bracket is derived by polymerizing an alkylene oxide of no more than six carbon atoms, preferably no more than four, such as ethylene oxide, propylene oxide, butylene oxide, amylene oxide and hexylene oxide. The Y core is a saturated aliphatic hydrocarbon radical having amino or oxygen groups therein through which the remaining portions of the polyol are connected.

Typical polyols that can be used include the polymerization products of one or more of the alkylene oxides such as ethylene oxide, propylene oxide, 1,2-epoxy-butane, 1,2-isobutylene oxide, chloroprene oxide, 1,2-epoxy-pentane and the like. The preferred triols are similar polymerization products coupled onto glycerine, trihydroxymethylpropane, and the like. Also suitable are polyalkylene oxides which have been coupled by amines or on which polyalkylene oxide polymer chains have been derived by reaction of the alkylene oxide with polyamines such as ethylene diamine, for example

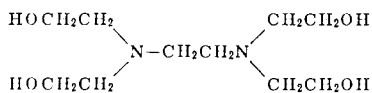

Also suitable are polyalkylene oxide derivatives of triethanolamine, triisopropanolamine and tributanolamine.

The grafting operation is advantageously catalyzed by an azo catalyst, such as azo-bis-isobutyro-nitrile, alpha,alpha'-azo-2-methyl butyronitrile, alpha,-alpha'-2-methyl heptonitrile, 1,1'-azo-1-cyclohexane carbonitrile, dimethyl alpha,alpha'-azo-isobutyrate, 4,4'-azo-4-cyanopentanoic acid, and the like. It is also possible to catalyst the grafting operation by other free radical polymerization catalysts such as peroxy types, as well as customary redox systems, and also by irradiation. Where a free radical generating compound is used, the proportion is generally 0.001 to 5% preferably 0.05 to 1% by weight calculated on the monomer mixture.

Illustrative peroxy catalysts are the well-known peroxides, persulfates, perborates, percarbonates, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, siisopropyl-benzene hydroperoxide, cumene hydroperoxide, paramenthane hydroperoxide, diacetyl peroxide, di-alpha-cumyl peroxide, dipropyl peroxide, di-isopropyl peroxide, isopropyl-t-butyl peroxide, butyl-t-butyl peroxide, dilauroyl peroxide, difuroyl peroxide, ditriphenylmethyl peroxide, bis(p-methoxybenzoyl)peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-Decalin hydroperoxide, alpha-methyl-benzyl hydroperoxide, alpha-methyl-alpha ethyl benzyl hydroperoxide, Tetralin hydroperoxide, triphenylmethyl hydroperoxide, diphenylmethyl hydroperoxide, persuccinic acid, diisopropyl peroxy dicarbonate, and the like; a mixture of catalysts may also be used.

For imparting fire resistant properties to the ultimate polyurethane resins, it is generally advantageous to have a chlorine content in the chlorinated polyol dispersion in the range of 15–30 percent by weight, depending on the ultimate proportions of diisocyanate and polyol to be used in producing the polyurethane. Since vinyl chloride has 56.8 percent chlorine and vinylidene chloride has 73.2 percent chlorine, this means that at least 20%, preferably at least 25% of the monomer needs to be grafted to give the desired amount of chlorine in the polyol so that when it is further diluted and reacted with the diisocyanate the ultimate product will have fire resistant properties. However the introduction of such amounts of chloride by grafting either vinyl chloride or vinylidene chloride by itself results in solid or undesirably viscous or heterogeneous products. In contrast the process of this invention permits the grafting of vinyl chloride-vinylidene chloride mixtures in sufficient amounts to give the desired chlorine content while still keeping the polyol product at a fluid, easily workable viscosity. This avoids any need for solvents.

The fact that the product produced according to this invention is fluid and processable without the use of solvents is a distinct advantage since it avoids the necessity of removing solvent after the reaction with the diisocyanates to produce polyurethanes. This is not possible with corresponding grafted copolymers produced according to the prior art, which, in order to have a sufficiently high chlorine content, are either viscous solutions or precipitated powder.

In the grafting procedures used herein the liquid polyol is placed in an autoclave equipped with stirrer, heating means, temperature and pressure reading devices and top and bottom outlets. The catalyst is added and stirred until dissolved in the polyol. Where vinylidene chloride is used, this is added at this point and agitated for uniform distribution. Then the autoclave is purged with nitrogen and closed. Liquid vinyl chloride is added under pressure from a small pressurized container and the amount added is measured by noting the loss in weight of the pressurized container. When the desired amount of vinyl chloride has been added, the feed is cut off and the autoclave heated to polymerization temperature. This is generally maintained overnight or for approximately 16 hours. Unreacted monomer is stripped off while the reaction mass is still hot and then the liquid product is drained from the reactor through the bottom outlet. Tests are run on this product.

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight.

EXAMPLE I

A series of three experiments are performed in which polymerizations are conducted in a polyol and in which reaction conditions are identical except that in one case (A) vinyl chloride is used as the sole monomer component; in another case (B) vinylidene chloride is used as the sole monomer component; and in the third case (C) a 70-30 mixture of vinyl chloride and vinylidene chloride is used as the monomer composition. The proportions, reaction conditions and results are given below in Table I. As will be noted, Experiments A and B give a solid product, whereas the product obtained in Experiment C has a Brookfield viscosity of 20,000 cps.

TABLE I

| Component | A | B | C |
|---|---|---|---|
| Vinyl Chloride (parts) | 60 | | 42 |
| Vinylidene Chloride (parts) | | 60 | 18 |
| Triol* (parts) (mol.wt. 3000) | 100 | 100 | 100 |
| Azo Catalyst** (parts) | 1.5 | 1.5 | 1.5 |
| Temperature (°C.) | 65 | 65 | 65 |
| Reaction Time (hrs.) | 20 | 20 | 20 |
| Monomer Conversion (%) | 95 | 95 | 95 |
| Wt. Percent of Polymeric Material | 44.96 | 43.3 | 40.4 |
| Brookfield Viscosity (cps) | Solid | Solid | 20,000 |
| Percent Chlorine | 20.6 | 26.6 | 22.9 |

*The triol is propylene oxide derivative of glycerine having the formula $C_3H_5[(OC_3H_6)A$ weight of 3000.

**The azo catalyst is azobisisobutyronitrile.

EXAMPLE II

To further illustrate the undesirably high viscosities obtained when increasing amounts of vinyl chloride or vinylidene chloride alone are used, the procedures of Example I–A and I–B are repeated a number of times using varying amounts of vinyl chloride or vinylidene chloride and polymerizing to about 90–96% conversion. The amounts of these and the various results are given in the table below. These results show that as the chlorine content approaches the desired minimum of 15% solid products are obtained when vinyl chloride or vinylidene chloride is used alone.

TABLE II

| Component | D | E | F | G | H |
|---|---|---|---|---|---|
| Vinyl Chloride (parts) | 20 | 25 | 30 | | |
| Vinylidene Chloride (parts) | | | | 15 | 20 |
| Triol* (parts) | 100 | 100 | 100 | 100 | 100 |
| Azo Catalyst** (parts) | 1.5 | 1.5 | 1.5 | 1.5 | 1.5 |
| Temp. (°C.) | 65 | 65 | 65 | 65 | 65 |
| % Monomer Conversion | 93 | 96 | 95 | 90 | 95 |
| % Chlorine | 9.5 | 10.8 | 13.4 | 8.6 | 12.2 |
| Brookfield Viscosity | 8,800 | 100,000 | Solid | Thick Paste | Solid |

*Same as in Example I.
**Same as in Example I.

EXAMPLE III

The following procedure is used on each of the products A, B and C of Example I. Each crude polyol graft containing excess polyol is extracted for 24 hours with methanol in a Soxhlet extractor to remove excess polyol. The methanol extracted material is analyzed for chlorinated polymers by infrared analysis and found to contain none. The purified polyol grafts are analyzed quantitatively for chlorine by standard fusion procedure in a Parr Bomb with sodium peroxide which converts all of the chlorine to chloride ion. The chloride is then determined volumetrically by the Volhard Method, using silver nitrate to precipitate the chloride and titrating the excess silver nitrate with potassium thiocyanate. Through the use of the appropriate molecular weight factor, the amount of chloride is expressed as the percent of vinyl chloride, vinylidene chloride or vinyl chloride-vinylidene chloride mixture in the polyol graft. The weight of monomer polymerized divided by this percentage gives us the weight of pure graft polyol. Subtracting the weight of polymerized monomer from this gives us the weight of polyol grafted. From this and the amount of polyol charged, the percent of original polyol grafted is calculated, with the results reported below in Table III. These results show that in C, less of the original polyol is used in the grafting operation so that more remains to serve as the dispersion medium.

TABLE III

| | A | B | C |
|---|---|---|---|
| Portion of Chlorinated Repeating Units in Purified Graft | 80.8% | 84.0% | 90.0% |
| Percent of Original Polyol Grafted | 13.6 | 11.0 | 6.5 |
| Percent Ungrafted Polyol Remaining as Dispersion Medium | 86.4 | 89 | 93.5 |
| Percent Grafted Polymer in Original Grafted Dispersion | 45 | 43.3 | 40.4 |

EXAMPLE IV

The procedure of Example I–C is repeated using in place of the 1.5 parts of azobisisobutyronitrile, 1.5 parts of benzoyl peroxide. The viscosity of the product is compared with that obtained in Example I–C as reported below. This illustrates the fact that while peroxy type catalysts give satisfactory results in producing stable dispersions of reduced viscosity in accordance with the invention, the azo type catalysts give much lower viscosities than do the peroxy type.

| | Catalyst | Brookfield Viscosity |
|---|---|---|
| Example I–C | Azo | 20,000 cps. |
| Example IV | Bz$_2$O$_2$ | 86,000 cps. |

EXAMPLE V

The procedure of Example I–C is repeated using in place of the 100 parts of triol of that example, 45 parts of the same triol and 55 parts of the same type of triol having a molecular weight of 1,500. As shown by the results tabulated below, the use of a lower molecular weight triol also aids in reducing the viscosity, although there is a limit to which the molecular weight can be reduced and still produce a stable dispersion.

| | Brookfield Viscosity |
|---|---|
| Example I–C | 20,000 cps. |
| Example V | 8,000 cps. |

EXAMPLE VI

The procedure of Example I–C is repeated using in place of the triol of that example a corresponding triol having a molecular weight of 1,500. The resultant homogeneous dispersion has a Brookfield viscosity of 6,300 centipoises and shows a conversion of 90%.

EXAMPLE VII

The procedure of Example I–C is repeated using as the monomer mixture 30 parts of vinyl chloride and 30 parts of vinylidene chloride. A homogeneous dispersion is obtained with a conversion of 90% and a Brookfield viscosity of 3,600 centipoises.

EXAMPLE VIII

The procedure of Example I–C is repeated using as the polyol 70 parts of the triol of Example I–C and 30 parts of polypropylene oxide diol having a molecular weight of 2,000. The conversion is 94% and the resultant homogeneous dispersion has a Brookfield viscosity of 13,800 centipoises.

EXAMPLE IX

The procedure of Example I–C is repeated using as the polyol 70 parts of the triol of Example I–C and 30 parts of a tetraol with a molecular weight of 1,500 derived from ethylenediamine and ethyleneoxide. The conversion is 95% and the homogeneous dispersion has a Brookfield viscosity of 100,000 centipoises.

EXAMPLE X

The procedure of Example I–C is repeated a number of times with satisfactory improvements in viscosity as described herein, using in place of the 100 parts of triol the following compositions respectively:
  a. 80 parts triol of Example I 20 parts of polyethylene oxide (diol) of 3,000 molecular weight
  b. 70 parts triol of Example I 30 parts polypropylene oxide (diol) of 2,500 molecular weight
  c. 50 parts triol of Example I 25 parts polyethylene oxide (diol) of 2,500 molecular weight
  d. 75 parts triol of Example I 25 parts of propylene oxide derivative of ethylenediamine (tetrol) of 4,000 mol. wt.
  e. 80 parts triol of Example I 20 parts polyethylene oxide derivative of ethylamine (diol) of 2,000 molecular weight

EXAMPLE XI

The procedure of Example I–C is repeated a number of times with improved viscosity as described herein using in place of the triol of that example an equal weight respectively of:

a. propylene oxide derivative of 1,1,1-trihydroxymethylpropane (4,000 mol.wt.)
b. ethylene oxide derivative of glycerine (3,000 mol.wt.)
c. butylene oxide derivative of glycerine (2,500 mol.wt.)
d. ethylene oxide derivative of triethanolamine (3,000 mol.wt.)
e. propylene oxide derivative of triethanolamine (3,500 mol.wt.)

EXAMPLE XII

A grafted polyol dispersion prepared as in Example I–C containing 21.8% chlorine, having an hydroxy number of 36, and a Brookfield viscosity of 20,000 cps., is used in preparing a flexible polyurethane foam using the following formulation:

| | | |
|---|---|---|
| Example I-C Grafted Polyol Dispersion | 100 | grams |
| Toluene Diisocyanate (108 Index) | 42.5 | grams |
| Silicone Surfactant | 1.0 | grams |
| Triethylene Diamine (33% in dipropylene glycol) | 0.8 | gram |
| Water | 3.4 | grams |
| Trichlorofluoromethane (Freon 11) | 2.0 | grams |
| Antimony Oxide | 5.0 | grams |
| Stannous Octoate | 0.09 | gram |

The formulation is hand-mixed until uniform composition is achieved and then poured into a bread-loaf pan and allowed to stand overnight at ambient temperature. The resultant flexible foam product has the following physical properties:

| | |
|---|---|
| Density | 1.39 grams/cc |
| Indentation Load Density (25%)* | 33.1 |
| Indentation Load Density (65%)* | 80.2 |
| Hysteresis | 51.5 |
| Sag Factor | 2.44 |
| Tensile Strength (lbs./in.²) | 14.4 |
| Elongation (%) | 14.2 |
| Tear (lbs./in.) | 1.52 |
| Compression Set (50%) | 44.0 |
| Compression Set (90%) | 79.2 |
| ASTM 1692T Flame Test | self-extinguishing |

*ASTM D-1055 (Page 473, ASTM Standards, 1961, for Rubber, Electrical Insulation)

EXAMPLE XIII

The following formulation is hand-stirred to make a uniform mixture:

| | | |
|---|---|---|
| Example I-C Grafted Polyol Dispersion | 100 | grams |
| Toluene Diisocyanate (108 Index) | 6.1 | grams |
| Triethylene Diamine (33% in dipropylene glycol) | 0.4 | gram |
| Stannous Octoate | 0.13 | gram |

A film is cast from the resultant mixture and heated at 150° C. for five minutes. A clear, flexible, very elastic coating is obtained.

EXAMPLE XIV

The following formulation is hand-mixed until a uniform composition is obtained:

| | | |
|---|---|---|
| Example I-C Grafted Polyol Dispersion | 100 | grams |
| Diphenylmethane-4,4'-Diisocyanate (108 Index) | 8.7 | grams |
| Triethylenediamine (33% in dipropylene glycol) | 0.4 | gram |
| Stannous Octoate | 0.13 | gram |

The resultant mixture is heated at 150° C. for 5 minutes and a tough elastomeric material is obtained.

In addition to the improvement illustrated above in which fluid products are obtained using a combination of vinylidene chloride and vinyl chloride in the polymerization grafting, it has also been found that the viscosity of the grafted product can be even further reduced by the presence of a chain transfer agent during the grafting operation. In such cases at least 0.1 percent by weight is desirable for this purpose. However, where no chain transfer agent is used, it is preferable to use at least 15% by weight of vinylidene chloride in the monomer mixture.

The various types of chain transfer agents are well known in the polymerization art. Those particularly suitable for the purpose of this invention are halogenated hydrocarbons, such as carbon tetrachloride, trichloroethylene, chloroform, methylene chloride, carbon tetrabromide and other halogenated ethanes, propanes, butanes, pentanes and the like, mercaptans, alpha-olefins and aldehydes, such as amyl mercaptan, butyl mercaptan, hexyl mercaptan, phenyl mercaptan, benzyl mercaptan, isobutylene, isoamylene, alphamethyl styrene, acetaldehyde, butyraldehyde, caprylaldehyde, phenylacetaldehyde, benzaldehyde and the like.

The following Example XV illustrates the effect of chain transfer agents in even further reducing the viscosity of the grafted polyol product.

EXAMPLE XV

The procedure of Example I–C is repeated a number of times using the proportions, components and conditions recited below in Table III with the results also recited in that table.

TABLE III

| Components and Conditions | I | J | K | L | M |
|---|---|---|---|---|---|
| Vinyl Chloride (parts) | 42 | 42 | 42 | 42 | 42 |
| Vinylidene Chloride (parts) | 18 | 18 | 18 | 18 | 18 |
| Carbon Tetrachloride (parts) | — | 2 | 3 | — | — |
| Trichloroethylene (parts) | — | — | — | 2 | 3 |
| Triol* (parts) | 100 | 100 | 100 | 100 | 100 |
| Azo Catalyst** (parts) | 1.5 | 1.5 | 1.5 | 1.5 | 1.5 |
| Temp. (°C.) | 65 | 65 | 65 | 65 | 65 |
| % Monomer Conversion | 90 | 90 | 90 | 90 | 90 |
| % Chlorine | 22.9 | 22.6 | 22.5 | 22.6 | 22.5 |
| Brookfield Viscosity | 16,500 | 9,500 | 5,500 | 11,400 | 7,800 |

*Same as in Example I. **Same as in Example I.

Similar reductions in viscosity as compared to Control I are obtained when the procedure of Example XV is repeated using as the chain transfer agent equal amounts respectively of chloroform, methylene chloride, carbon tetrabromide, amyl mercaptan, thiophenol, benzyl mercaptan, isobutylene, alphamethyl styrene, acetaldehyde and benzaldehyde. Moreover, when the grafted polyol products of Example XV are used in preparing polyurethanes according to the procedures of Examples XII-XIV there are similar improved results.

As indicated above the stable dispersions of this invention are particularly useful in preparing fire-resistant polyurethanes by reaction with diisocyanates. Examples of such diisocyanates are the tolylene diisocyanates, hexamethylene diisocyanates, diphenylmethane diisocyanates, naphthalene diisocyanates, phenylene diisocyanates, bitolylene diisocyanates, dianisidine diisocyanates, dimethyldiphenylmethane diisocyanates, etc., such as meta-toluene diisocyanate, 4,4'-diphenyl diisocyanate, 4,4'-diphenylene methane diisocyanate, 1,5-naphthalene diisocyanate, 4,4'-diphenyl ether diisocyanate, p-phenylene diisocyanate, ethylene diisocyanate, trimethylene diisocyanate, cyclohexylene diisocyanate, 2-chloropropane diisocyanate, tetrachlorophenylene diisocyanate-1,4, durylene diisocyanate, xylylene diisocyanates, 3,10-diisocyanatotricyclo(5.2.1.0$^{2.6}$)decane. While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. A stable fluid dispersion having a chloride content of at least 15 percent by weight comprising a grafted polyol having polymeric vinyl chloride and vinylidene chloride grafted thereto dispersed in ungrafted polyol having a molecular weight in the range of 500 to 5,500, the polymeric chloride portion of said grafted polyol comprising at least 21 percent of the total weight of said dispersion the said polymeric chloride portion comprising vinyl chloride and vinylidene chloride in the ratio of 15–88 percent by weight of vinyl chloride to 12–85 percent by weight of vinylidene chloride and said dispersion having a Brookfield viscosity of less than 100,000 centipoises, said polyol having the formula

wherein n is an integer having a value of 2–4, x is an integer of sufficient value to give the polyol a molecular weight of 500 to 5,500, R is hydrogen or an alkyl group of no more than two carbon atoms, and Y is a core radical having a valency corresponding to the value of n, said core radical having a saturated aliphatic hydrocarbon center and amino nitrogen or oxygen atoms through which said core radical is connected to the remainder of said polyol, and said polyol comprising at least 60 percent by weight of a polyol in which said n has a value of 3.

2. The dispersion of claim 1 in which said dispersion has a Brookfield viscosity of less than 40,000 centipoises.

3. The dispersion of claim 1 in which said polyol dispersion medium is a polyol having a molecular weight in the range of 1,500 to 5,000.

4. The dispersion of claim 1 in which said polyol dispersion medium is substantially all triol having a molecular weight in the range of 1,500–5,000.

5. The dispersion of claim 1 in which said polyol dispersion medium is substantially all triol having a molecular weight in the range of 3,000–5,000.

6. The dispersion of claim 1 in which said polyol is a triol and is a polypropylene oxide derivative of glycerine having a molecular weight of at least 1,500.

7. The dispersion of claim 6 in which said triol has a molecular weight of at least 3,000.

8. The dispersion of claim 1 in which said polyol is a triol and is a polypropylene oxide derivative of 1,1,1-trihydroxymethylpropane having a molecular weight of at least 1,500.

9. The dispersion of claim 1 in which said polyol is a triol and is a polyethylene oxide derivative of glycerine and has a molecular weight of at least 1,500.

10. The process of preparing a stable dispersion having a Brookfield viscosity of no more than 100,000 centipoises comprising the step of polymerizing in the presence of 0.001–10 percent by weight of a free-radical generating catalyst based on weight of monomeric mixture for a period of at least two hours at a temperature of 30°–80° C. a mixture of 21–45 parts by weight of a monomeric mixture consisting of 15–88 percent by weight of vinyl chloride, 12–85 percent by weight of vinylidene chloride and 0–5 percent by weight of a chain transfer agent, with 55–79 parts by weight of a polyol having a molecular weight in the range of 500 to 5,500, said polyol having the formula

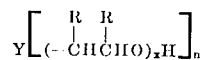

wherein n is an integer having a value of 2–4, x is an integer of sufficient value to give the polyol a molecular weight of 500 to 5,500, R is hydrogen or an alkyl group of no more than two carbon atoms, and Y is a core radical having a valency corresponding to the value of n, said core radical having a saturated aliphatic hydrocarbon center and amino nitrogen or oxygen atoms through which said core radical is connected to the remainder of said polyol, and said polyol comprising at least 60 percent by weight of a polyol in which said n has a value of 3.

11. The process of claim 10 in which said monomeric mixture contains at least 15 percent by weight of vinylidene chloride.

12. The process of claim 11 in which said catalyst is an azo catalyst.

13. The process of claim 12 in which said catalyst is azobisisobutyronitrile.

14. The process of claim 11 in which said temperature is in the range of 45° to 75° C.

15. The process of claim 11 in which the polymerization is continued until a conversion of at least 50 percent of the monomeric mixture has been effected.

16. The process of claim 11 in which the molecular weight of said polyol is in the range of 1,500–5,000.

17. The process of claim 11 in which the molecular weight of said polyol is in the range of 3,000–5,000.

18. The process of claim 11 in which said free-radical generating catalyst is present in the amount of 0.05 to 1 percent by weight based on the monomeric mixture.

19. The process of claim 11 in which said polyol is essentially all triol.

20. The process of claim 11 in which said polyol comprises a propylene oxide derivative of glycerine and has a molecular weight of at least 1,500.

21. The process of claim 11 in which said polyol comprises a propylene oxide derivative of 1,1,1-trihydroxymethylpropane and has a molecular weight of at least 1,500.

22. The process of claim 11 in which said polyol comprises an ethylene oxide derivative of glycerine and has a molecular weight of at least 1,500.

23. The process of claim 11 in which said polyol comprises the ethylene oxide derivative of 1,1,1-trihydroxymethylpropane.

24. The process of claim 11 in which said polyol consists essentially of a propylene oxide derivative of glycerine having a molecular weight in the range of 1,500 to 5,000 and said temperature is in the range of 45° to 75° C. and said polymerization is continued until a conversion of at least 50 percent of the monomer is effected.

25. The process of claim 10 in which said mixture contains at least 0.1 part of said chain transfer agent.

26. The process of claim 25 in which said transfer agent is trichloroethylene.

27. The process of claim 25 in which said transfer agent is carbon tetrachloride.

28. The process of claim 25 in which said transfer agent is isobutylene.

* * * * *

UNITED STATES PATENT OFFICE
CERTIFICATE OF CORRECTION

Patent No. 3,655,553                    Dated April 11, 1972

Inventor(s) RAYMOND C. DE WALD

It is certified that error appears in the above-identified patent and that said Letters Patent are hereby corrected as shown below:

In the Abstract, line 12, "mono-mer" should read -- monomer -- . Column 2, line 10, "24-45" should read -- 25-45 -- . Column 4, line 73 first asterisk, the formula "$C_3H_5[(OC_3H_6)A$" should read -- $C_3H_5[(OC_3H_6)_xOH]_3$ --

Column 4, line 73, first asterisk after the formula and before "weight of 3000" should be inserted -- wherein x has an appropriate average value to give a molecular -- . Column 8, line 30 and line 32, "Table III" should read -- Table IV -- .

Signed and sealed this 22nd day of January 1974.

(SEAL)
Attest:

EDWARD M. FLETCHER, JR.                RENE D. TEGTMEYER
Attesting Officer                       Acting Commissioner of Patents